UNITED STATES PATENT OFFICE.

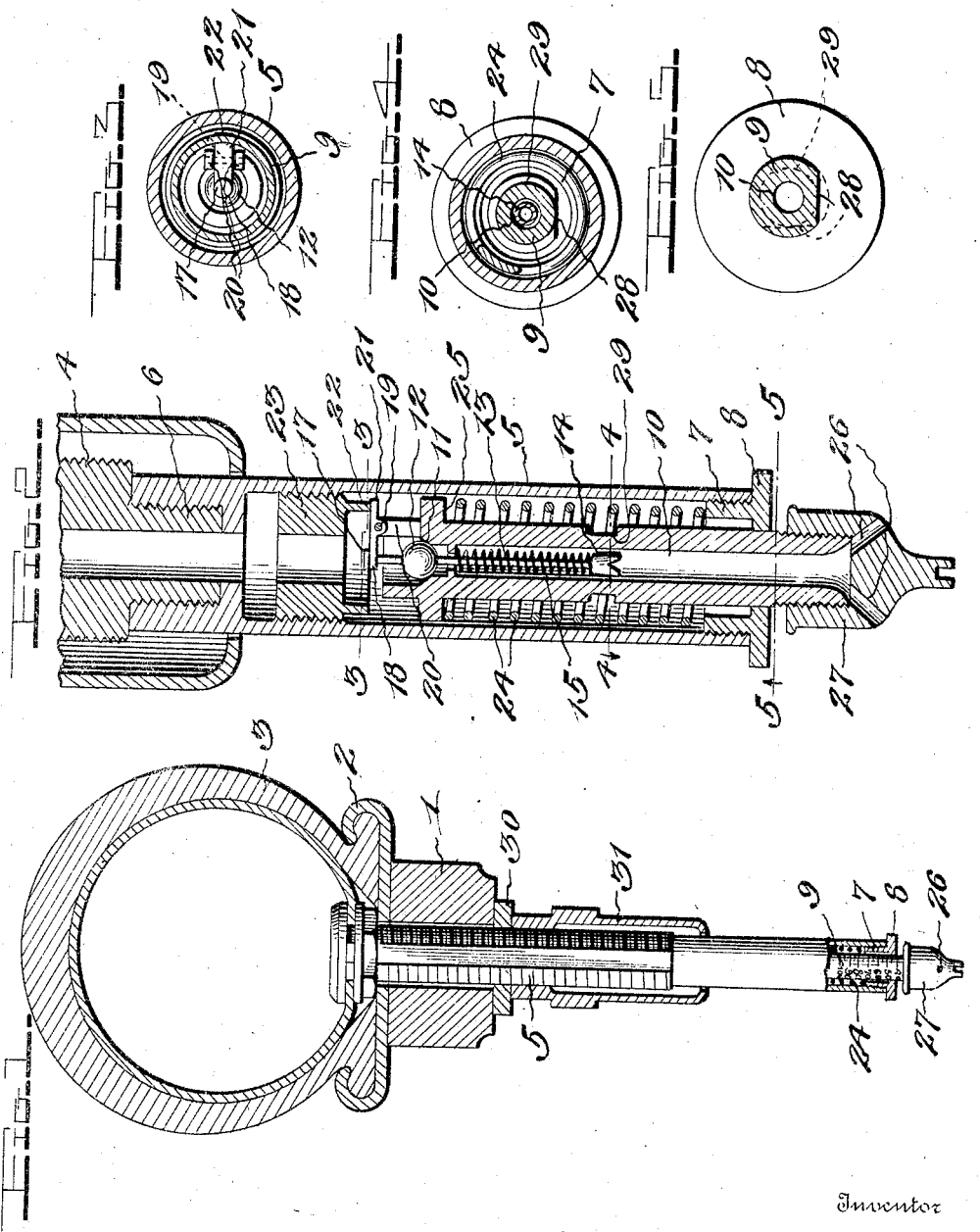

JOSEPH B. POLO, OF CLEAR LAKE, SOUTH DAKOTA.

TIRE-ALARM.

1,038,433.

Specification of Letters Patent. Patented Sept. 10, 1912.

Application filed January 27, 1912. Serial No. 673,925.

*To all whom it may concern:*

Be it known that I, JOSEPH B. POLO, a citizen of the United States, residing at Clear Lake, in the county of Deuel and State of South Dakota, have invented certain new and useful Improvements in Tire-Alarms, of which the following is a specification, reference being had to the accompanying drawings.

My present invention comprehends certain new and useful improvements in automobile appliances or accessories and relates particularly to the class of attachments known as tire alarms, designed to give notice to the occupants of an automobile or the like, when a tire becomes deflated below a predetermined point.

The invention has for its primary object an improved construction of device of this character which will be composed of comparatively few and simple parts that may be cheaply manufactured, readily assembled and easy to maintain in properly working order.

The invention also has for its object an improved construction of combined tire alarm and gage, whereby a spring pressed plunger of the device will not only serve as a part of the alarm proper, but will at all times indicate, owing to its position, the air pressure within the tire tube. And the invention also aims to generally improve this class of devices and to render them more useful and commercially desirable.

With these and other objects in view as will more fully appear as the description proceeds, the invention consists essentially in a tire alarm, including a casing which may be readily secured to any of the ordinary or conventional tire valve stems, an inwardly spring pressed tubular plunger mounted in said casing and adapted to indicate the pounds pressure in the inner tube to the valve stem of which the device is secured, a spring seated valve carried by said plunger, and means also carried by the plunger and engageable with a relatively stationary part of the device whereby at a predetermined point in the inward movement of the plunger due to a decrease in the air pressure, the spring seated valve will be positively moved away from its seat, so as to allow the air to issue from sound producing ports that are formed in the outer end of the plunger cap. And the invention also consists in certain constructions, arrangements and combinations of the parts that I shall hereinafter fully describe and claim.

For a full understanding of the invention reference is to be had to the following description and accompanying drawing, in which:—

Figure 1 is a transverse sectional view through a wheel felly, rim and tire showing my invention in applied position. Fig. 2 is a longitudinal sectional view of the device. Fig. 3 is a transverse sectional view on the line 3—3 of Fig. 2. Fig. 4 is a similar view on the line 4—4 of Fig. 2, and Fig. 5 is a section on line 5—5 of Fig. 2.

Corresponding and like parts are referred to in the following description and designated in the accompanying drawing by like reference characters.

Referring to the drawing, the numeral 1 designates a wheel felly, 2 a rim secured thereto, and 3 a pneumatic tire held on the rim and having its inner tube with the usual valve stem 4, which, in carrying out my invention is devoid of the ordinary spring seated valve. These parts may be, of themselves, of any desired or approved construction or type.

The tire alarm of my present invention comprises a preferably cylindrical casing 5 which is interiorly threaded at one end whereby it may be detachably engaged with and held on the ordinary threaded nipple 6 of the valve stem 4. The outer end of the cylindrical casing 5 is interiorly threaded for engagement by the threaded bushing 7 provided with a stop flange 8, as shown, and movable in the bushing 7 and the casing 5 is a tubular plunger 9, the opening which extends longitudinally entirely through said plunger being designated 10. At its inner end, the plunger 9 is formed with a valve seat 11 communicating with the inner end of the opening 10, and an ordinary pneumatic tire check valve 12 is adapted to close on said seat, so as to prevent air from passing out through the opening. The valve 12 is formed with a guiding stem 13 the outer end of which extends into the opening 10 and is provided with the ordinary spring retaining head 14 against which the coiled valve closing spring 15 bears, whereby to normally hold the valve 12 on its seat 11. The inner end of the stem is provided with a head 17 which is engaged by one end of a trip lever 18. This lever is fulcrumed intermediate of its ends as at 19 on a post 20 or the like which forms a part of the plunger 9, the lever having a laterally extended arm 21 which is designed for engagement by a stop lug 22 that projects inwardly from and that is formed preferably as an integral part of a bushing 23 which is threaded in the inner end of the casing 5.

A spring 24 is coiled around the plunger 9, the inner end of said spring bearing against an annular shoulder 25 which is formed on the plunger near the inner end of the latter, and the outer end of the spring reacting against the bushing 7, as clearly illustrated in Fig. 2.

From as much of the description as has preceded, in connection with the accompanying drawing, the operation of my improved tire alarm will be apparent.

In the practical use of the device, so long as the pressure within the inner tube is at normal, or above, the plunger 9 will be held in a relatively extended position within the casing 5, and consequently, the trip lever 18 will be out of contact with the outwardly projecting lug 22 of the bushing 23. As the air pressure decreases, the plunger 9 will be moved inwardly by its spring 24, in an evident manner, and when the air pressure is reduced to a predetermined point, say forty pounds to the square inch, the trip lever 18 will have its rearwardly or laterally extending arm 21 engaged by the lug 22, whereupon a further inward movement of the plunger will, as is obvious, cause the lever 18 to rock on its fulcrum 19 and positively move the valve 12 from its seat 11 against the tension of the spring 15. Thus the air will be permitted to pass out through the opening 10 and issue from the ports 26 that are formed in a preferably detachable cap 27 secured to the outer end of the plunger. As the air issues through the ports 26 it will produce an audible signal and apprise the occupant of the car that a tire has become deflated beyond the safety point.

It is to be particularly noted, as best illustrated by Figs. 4 and 5, that the plunger 9 and its bushing 7 are not entirely circular in cross section, each being formed with a flat side, designated 28. By the engagement of the adjacent flat surfaces 28, the plunger 9 will be prevented from turning when the nipple of a tire pump is screwed thereon or removed therefrom. In order to prevent the escape of the air when the tire pump nipple is being unscrewed from the threaded outer end of the plunger 9, the plunger is formed intermediate of its ends with a circular portion 29, so that the plunger may be pulled out and the shoulder formed by the circular portion engaged with the surface 28 of the bushing 7 so as to temporarily hold the plunger in a partially extended position, until the pump nipple has been entirely detached, whereupon the plunger 9 is turned so as to permit its spring 24 to freely act. The plunger 9 displays proper graduations, as best illustrated in Fig. 1, whereby the pressure within the tube may be determined at a glance, the plunger thereby fulfilling a double function.

30 designates the ordinary retaining nut and 31 designates the ordinary dust excluding sleeve which, in the present instance, is open at its outer end, to accommodate the casing 5.

If desired, the outer end of the cap 27 may be recessed as shown, so as to serve for a valve removing wrench.

By varying the position of the plug or bushing 23 in the casing 5, it is manifest that its lug 22 may be caused to engage and trip the lever 18 in different relative positions of the plunger, whereby the point at which the alarm would be sounding may be varied, at will.

While the accompanying drawing illustrates what I believe to be the preferred embodiment of my invention, it is to be understood that the invention is not limited thereto but that various changes may be made in the construction, arrangement and proportion of the parts without departing from the scope of the invention as defined in the appended claims.

Having thus fully described my invention what I claim is:—

1. An alarm of the character described, including a casing, a spring retracted plunger mounted therein and formed with a longitudinal opening and a valve seat leading thereinto, a spring pressed valve on said seat, a lever operatively connected to said valve to unseat the same, and means for automatically tripping said lever at a predetermined point in the inward movement of the plunger.

2. An alarm of the character described, including a casing, a plunger mounted in the casing and spring pressed inwardly therein, the plunger being formed with a longitudinal opening and a valve seat opening thereinto, a spring pressed valve on said seat, and opening inwardly therefrom, the plunger being formed with a sound producing port communicating with its opening, the valve being provided with an inwardly projecting stem, a lever carried by the plunger and engaging said stem and relatively stationary means carried by the casing for tripping said lever at a predetermined point in the inward movement of the plunger.

3. An alarm of the character described, including a casing, a plunger movable therein and spring pressed inwardly, the plunger being formed with a longitudinal opening extending therethrough adapted to produce a signal, the plunger being formed at the inner end of said opening with a valve seat, a valve spring held on said seat and movable inwardly to open position, the valve being formed with an inwardly projecting stem, a collar adjustably mounted on said stem, a lever carried by the plunger, and relatively stationary means carried by the casing for automatically tripping said lever at a predetermined point in the inward movement of the plunger.

4. An alarm of the character described, including a casing, a plunger movable therein and spring pressed inwardly, the plunger being formed with an opening leading to the atmosphere and with a valve seat communicating with said opening, a spring pressed valve mounted on said seat and opening inwardly, means for automatically opening said valve at a predetermined point in the inward movement of the plunger, and means for holding said plunger stationary in an extended position, against the tension of its spring and independently of the air pressure.

5. An alarm of the character described, including a casing, a plunger movable therein and spring pressed inwardly, the plunger being formed with an opening adapted to produce an audible signal and with a valve seat communicating with and facing inwardly from said opening, a spring pressed valve mounted on said seat, a trip lever carried by the plunger and adapted to open the valve, and a bushing carried by the casing and formed with a lug adapted to engage said lever to trip the same at a predetermined point in the inward movement of the plunger.

6. An alarm of the character described, including a casing, a bushing secured to the outer end of the casing and formed with a partially circular and a partially straight wall, a plunger movable in said casing and formed with an exterior wall adapted to fit the wall of the bushing, the plunger being movable longitudinally in the casing and spring pressed inwardly therein, the plunger being formed intermediate of its ends with a shoulder adapted to engage the outer end of the straight portion of the bushing wall whereby to hold the plunger, against the tension of its spring and independently of air pressure in a partially extended position, at will; the plunger being formed with an opening and a valve seat communicating with said opening and facing inwardly, a valve adapted to close on said opening, and means for automatically opening said valve at a predetermined point on the inward movement of the plunger.

7. An alarm of the character described, including a casing a plunger movable longitudinally in the casing and spring pressed inwardly therein, the plunger being formed with a sound producing opening and an inwardly facing valve seat communicating with said opening, a spring pressed valve adapted to close on said seat, the plunger being formed at its inner end with an inwardly projecting post, a lever fulcrumed intermediate of its ends on said post, the valve being formed with an inwardly projecting stem engaged by one arm of said lever and a bushing screwing in the inner end of the casing and formed with an outwardly projecting lug adapted to engage the other arm of the lever to trip the latter at a predetermined point in the inward movement of the plunger.

8. An alarm of the character described, including a casing, a plunger movable therein and spring pressed inwardly, the plunger being formed with an opening adapted to produce an audible signal and with a valve seat communicating with and facing inwardly from said opening, a spring pressed valve mounted on said seat, a trip lever carried by the plunger and adapted to open the valve, and a bushing adjustably mounted in the casing and formed with a lug adapted to engage said lever to trip the same at a predetermined point in the inward movement of the plunger.

In testimony whereof I hereunto affix my signature in the presence of two witnesses.

JOSEPH B. POLO.

Witnesses:
GEO. S. LIVINGSTON,
FREDERICK S. STITT.